Figure 1:
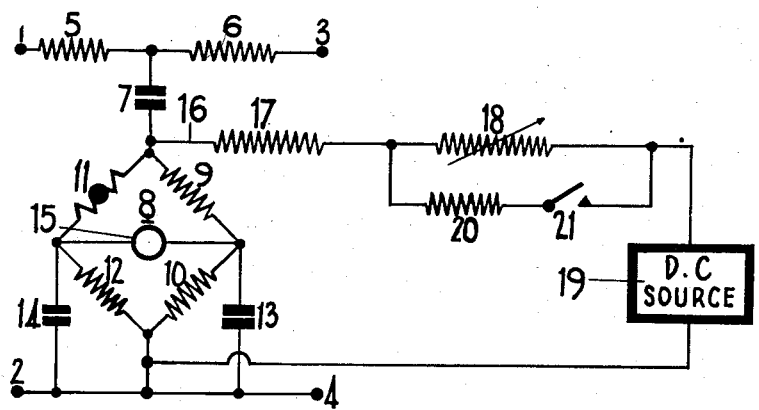

Sept. 29, 1959             B. EASTER             2,906,957

APPARATUS FOR OBTAINING MEASUREMENTS OF ELECTRIC POWER

Filed May 2, 1955

INVENTOR
BRIAN EASTER
BY
ATTORNEY

United States Patent Office 2,906,957
Patented Sept. 29, 1959

2,906,957
APPARATUS FOR OBTAINING MEASUREMENTS OF ELECTRIC POWER

Brian Easter, Chalfont St. Peter, England, assignor to The General Electric Company Limited, London, England Application May 2, 1955, Serial No. 505,389

Claims priority, application Great Britain May 4, 1954

5 Claims. (Cl. 324—98)

The present invention relates to an electric power monitoring apparatus.

More particularly the invention is concerned with apparatus of the kind which comprises a bridge containing a temperature-sensitive resistive element such as a thermistor element or an electric lamp, and one object of the present invention is to provide an improved form of such apparatus which is arranged so that the bridge is balanced when the power to be monitored by the apparatus has a predetermined value.

According to the present invention, apparatus for monitoring electric power comprises an impedance bridge which contains a temperature-sensitive resistive element, a first path for supplying power to be monitored to at least the said element, a source of electric current for said bridge, a second path which is arranged to supply current from the said source across the said bridge, a first variable impedance means in said second path, means to determine when the bridge is balanced, said first impedance means being arranged to vary the impedance of the current from said source in order to balance the bridge when the power to be monitored is not supplied to the bridge in order to compensate for changes in ambient temperature, a second fixed impedance means insertable in said second path to effect a step change in the amplitude of the current from said source such that when the power to be monitored is supplied over said first path, the power dissipated in the bridge due to the said source has been changed so that the bridge is again balanced, the impedance of the first and second impedance means and the impedance, exclusive of the impedance of the first and second impedance means, of said second path and of said bridge being so related that the change in power from said source experienced upon insertion of the second impedance means in the second path has a value which is not appreciably dependent on variations in the value of current from said source set by varying the first impedance means in balancing the bridge when the power to be monitored was not supplied to the bridge whereby the value of the monitored power is substantially independent of such variations in the value of said first impedance means.

The current supplied across the bridge may be either direct current, that is to say of zero frequency, or alternating current having a frequency that is low relative to the frequency of the power to be measured.

The temperature-sensitive resistive element may be a thermistor element and the bridge may be connected in a shunt arm of an attenuation pad.

Examples of apparatus in accordance with the present invention will now be described with reference to the three figures of the accompanying drawing.

Figure 2:
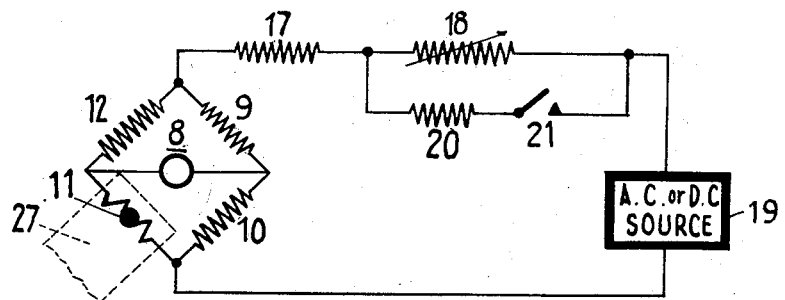

In making measurements on radio equipment and systems it is known to utilise a signal having a random waveform. This signal is often referred to as a "noise" signal, and is required to have a predetermined power level which may, for example, be 1 milliwatt. It is desirable to be able to monitor the power level of this noise signal, and the first example of apparatus which is in accordance with the present invention and which enables this to be done in the frequency band between, say, 100 kilocycles per second and 1 megacycle per second, is shown in Figure 1; Figure 2 shows the circuit diagram of a bolometer bridge incorporating the present invention.

Referring now to Figure 1, the apparatus takes the form of a T-network attenuation pad so that the apparatus has a pair of input terminals 1 and 2 and a pair of output terminls 3 and 4, the input and output terminals 2 and 4 being connected directly together. The two series arms of the T-network each consist of a resistor 5 or 6 while the shunt arm consists of a blocking capacitor 7 connected in series with a bridge 8. As far as the shunt arm of the T-network is concerned, the bridge 8 consists of two-parallel-connected paths, one of these consisting of two resistors 9 and 10 that are connected in series while the other consists of a thermistor element 11 in series with a resistor 12, the two resistors 10 and 12 being shunted by by-pass capacitors 13 and 14 respectively. Connections to the T-network are thus made across one diagonal of the bridge 8 and a detector 15, such as a moving coil micro-ammeter, is connected across the other diagonal. This detector 15 is adapted to determine when the bridge is balanced with respect to direct current flowing through the bridge 8.

A path 16 is provided for supplying direct current to the said two paraliel-connected paths of the bridge 8 so that, during operation of the apparatus, the resistance of the thermistor element 11 is determined partially by the amplitude of this direct current and partially by the power of the noise signal that is supplied by a suitable source (not shown) to the pair of input terminals 1 and 2. As will be apparent hereinafter, the bridge 8 is normally balanced when the arrangement is in use, so that the thermistor element 11 then has a particular value of resistance and the insertion loss of the attenuation pad has a predetermined value. Thus, when the apparatus has been set up, it is merely necessary for the level of the power of the noise signal supplied to the input terminals 1 and 2 to be adjusted so that the bridge 8 is balanced, as determined by the detector 15, in order to ensure that the power of the noise signal supplied by the pair of output terminals 3 and 4 to a load that is correctly matched to the attenuation pad has the required predetermined value.

The path 16 for supplying direct current to the bridge 8 includes a fixed resistor 17 and a resistor 18 that is connected in series between the source of direct current 19 and the junction of the bridge 8 and the blocking capacitor 7. In parallel with the variable resistor 18 there are connected another fixed resistor 20 in series with a switch 21 which may, for example, be of the push-button type and which is normally open.

In the apparatus described the resistors 9, 10 and 12 of the bridge 8 have values of 400, 400 and 133.3 ohms respectively. It will be appreciated, therefore, that for the bridge 8 to be balanced the thermistor element 11 must have a resistance of 133.3 ohms. Thus, for the bridge 8 to be balanced a definite power must be dissipated in the thermistor element 11 such that the resistance of the thermistor element 11 is 133.3 ohms. The resistance of the thermistor element 11 will, however, vary in dependence upon its temperature, while its temperature, in turn, varies in dependence upon (i) the ambient temperature and (ii) the total power dissipated in it, this total power being made up of a first part due to the source 19 and a second part due to the noise signal when this signal is supplied to the apparatus.

That part of the power dissipated in the thermistor element 11 due to the source 19 may be varied by varying the value of the resistor 18 and, to make the apparatus ready for use, the resistor 18 is adjusted until the bridge 8 is balanced with the switch 21 closed and no noise signal supplied to the apparatus. This first setting is necessary because the value which the resistor 18 must have for the bridge 8 to be balanced with the switch 21 closed and no noise signal supplied to the apparatus will not always be the same, but will vary with the ambient temperature because of the effect of the ambient temperature on the resistance of the thermistor element 11.

At this stage the apparatus is ready for use, so that the switch 21 is opened and the noise signal to be monitored is supplied to the terminals 1 and 2. Opening the switch 21 will alter the power dissipated in the thermistor element 11, due to the source 19, so that the resistance of the thermistor element 11 changes and there is a consequent loss of balance in the bridge 8. This loss of balance is only restored when the noise signal has such a power level that the power dissipated in the thermistor element 11 due to the noise signal is such as to restore the resistance of the thermistor element 11 to its original value, that is to say, when the power dissipated in the thermistor element 11 due to the noise signal is equal to the change in the power dissipated in the thermistor element 11 due to the step change in the amplitude of the current supplied across the bridge 8 by the source 19 brought about by opening the switch 21.

The extent of the alteration in the power dissipation in the thermistor element 11 due to the source 19 brought about by opening the switch 21 is dependent upon the value of the resistor 20. It is therefore necessary to choose the value of the resistor 20, in a manner that will be apparent hereinafter, such that the power level of the noise signal required to rebalance the bridge 8 is equal to the predetermined level, in this case 1 milliwatt.

It will be appreciated, however, that the power level of the noise signal which is necessary to rebalance the bridge 8 would normally also be dependent upon the value of the resistor 18 which, as previously indicated, has been adjusted to a value that depends upon the ambient temperature. In order to avoid this undesirable dependency of the said necessary level of the noise signal on the resistor 18, the value of the resistor 18 and of the other resistance traversed by the direct current from the source 19 are selected as follows:

The change ($\Delta P$) of direct current power dissipated in the whole bridge 8, between the condition when the switch 21 is closed and the condition when the switch 21 is open, the noise signal not then being supplied to the apparatus, is given by the expression:

$$\Delta P = E^2 \left[ \frac{(R+R_2)^2}{(RR_1+R_1R_2+RR_2)^2} - \frac{1}{(R_1+R_2)^2} \right] R_B \quad (1)$$

where $E$ is the voltage of the direct current source 19, $R_B$ is the resistance of the bridge 8 presented to the attenuation pad, $R_1$ is the total resistance traversed by the direct current except for the resistors 18 and 20 and consists of the resistor 17, the internal resistance of the direct current source 19 and the resistance ($R_B$) of the bridge 8, $R_2$ is the value of the resistor 18, and $R$ is the value of the resistor 20 that is connected in series with the switch 21.

In order that differences in the value at which the resistor 18 must be set to achieve balance with the noise signal not supplied to the apparatus and due, for example, to variations in the ambient temperature, shall have little effect on the level of the noise signal necessary to balance the bridge 8 when the noise signal is supplied and when the switch 21 is opened, it is desirable that $$\frac{d\Delta P}{dR_2}$$

shall be zero. The necessary condition for this to be the case is found by differentiating both sides of expression 1 with respect to $R_2$ and equating the right hand side to zero. Since neither $E$ nor $R_B$ are zero they may be divided out, leaving the condition that for $$\frac{d\Delta P}{dR_2}$$

to be zero:

$$(R+R_2)R^2 = \left[ R + \frac{R_1 R_2}{R_1+R_2} \right]^3 \quad (2)$$

If now $P_1$ is the power dissipated in the bridge 8 due to direct current flowing from the source 19 when the bridge 8 is balanced with the noise signal not supplied to the apparatus and the switch 21 open and $P_2$ is the increased power (due again to direct current from the source 19) when the switch 21 is closed, the expression 2 is satisfied by:

$$R_2 = \left[ \left(\frac{P_2}{P_1}\right)^{3/4} - 1 \right] R \quad (3)$$

$$R_1 = \frac{\left(\frac{P_2}{P_1}\right)^{3/4} - 1}{\left(\frac{P_2}{P_1}\right)^{1/4} \left[ \left(\frac{P_2}{P_1}\right)^{1/4} + 1 \right]} R \quad (4)$$

In the arrangement of the apparatus described above, the image impedances of the attenuation pad are each 75 ohms, and when the bridge 8 is balanced the attenuation pad introduces an attenuation of six decibels. Each of the resistors 5 and 6 in the series arms of the pad has a value of 25 ohms. If $P_1$ and $P_2$ are such that 11 and 12 milli-watts are the portions of $P_1$ and $P_2$ respectively actually dissipated by the thermistor element 11 and the direct current source 19 has a stabilised voltage of 250 volts, the resistor 17 may have a value of 6,520 ohms while the resistor 18 and the resistor 20 may have values of 13,880 and 208,000 ohms respectively.

The source 19 instead of supplying direct current may alternatively supply current having a frequency of, say, 1 to 10 kilocycles per second which is low relative to the frequency of the power to be measured. In addition the resistor 18 may be selected to have a suitable positive temperature co-efficient so that manual variation thereof for temperature compensation can be eliminated.

It will be appreciated that the present invention is not restricted to apparatus that is in the form of an attenuation pad. For example, as shown in Figure 2, the thermistor element 11 may be used as a bolometer to constitute the resistive load to which the high frequency power to be monitored is supplied over a wave guide 27 or a co-axial line. Direct current or relatively low frequency alternating current is arranged to be supplied across one diagonal of the bridge 8 in substantially the manner previously described so as to enable the bridge 8 to be balanced when no high frequency power is being dissipated in the thermistor element 11 and also to enable a step change in the amplitude of this current to be made corresponding to a predetermined amount of high frequency power being dissipated in the thermistor element 11. The three resistors 9, 10 and 12 and the thermistor element 11 that form the arms of the bridge 8 may be selected so that they have equal values of resistance when the bridge 8 is balanced. If this value is 133.3 ohms, the resistors 17, 18 and 20 may, in this case, have values of 4,360, 9,260 and 138,800 ohms respectively for the same values of thermistor dissipation as before.

The apparatus described above with reference to either Figure 1 or Figure 2 is only concerned with monitoring one value of power although it can be used more generally. Thus in the example shown in Figure 1, the resistor 20 and the switch 21 can be replaced by a plurality of resistors (one for each of the levels of power to be monitoring) and a multi-position switch, each of these resistors being connected between one of the switch contacts and the junction of the resistors 17 and 18 while the switch has at least one "off" position in which there is no electric current through the switch. The values of the resistors of the plurality are chosen to satisfy the expression 3 but it will be appreciated that if no other compensation is made when switching from one power to another, the value of $R_1$ will not satisfy the expression 4 although, in practice, it is found that over a limited range of powers the error introduced by having a fixed value of $R_1$ is acceptable.

I claim:

1. An apparatus for monitoring power, said apparatus comprising an impedance bridge which contains a temperature-sensitive resistive element, a first path for supplying power to be monitored to at least the said element, a source of electric current for said bridge, a second path which is arranged to supply current from the said source across the said bridge, a first variable impedance means in said second path, means to determine when the bridge is balanced, said first impedance means being arranged to vary the impedance of the current from said source in order to balance the bridge when the power to be monitored is not supplied to the bridge in order to compensate for changes in ambient temperature, a second fixed impedance means insertable in said second path to effect a step change in the amplitude of the current from said source such that, when the power to be monitored is supplied over said first path, the power dissipated in the bridge due to the said source has been changed so that the bridge is again balanced, the impedance of the first and second impedance means and the impedance, exclusive of the impedance of the first and second impedance means, of said second path and of said bridge being so related that the change in power from said source experienced upon insertion of the second impedance means in the second path has a value which is not appreciably dependent on variations in the value of current from said source set by varying the first impedance means in balancing the bridge when the power to be monitored was not supplied to the bridge whereby the value of the monitored power is substantially independent of such variations in the value of said first impedance means.

2. An apparatus as set forth in claim 1 wherein the temperature-sensitive resistive element is a thermistor element.

3. An apparatus as set forth in claim 1 wherein the impedance bridge is connected in a shunt arm of an attenuation pad.

4. An apparatus as set forth in claim 1 wherein the temperature-sensitive element is arranged to act as a bolometer.

5. An apparatus for monitoring power, said apparatus comprising an impedance bridge which contains a temperature-sensitive resistive element, a first path for supplying power to be monitored to at least the said element, a source of electric current for said bridge, a second path which is connected between the said source and the said bridge for the purpose of supplying current to the bridge, a variable resistor in series with a first fixed resistor in said second path, a second fixed resistor connected in series with a switch in shunt across the said variable resistor, the values of said variable resistor, of said first and second fixed resistors and of the resistance, exclusive of said variable resistor and of said first and second fixed resistors, of said second path and of said bridge being such that, if the bridge is first balanced to compensate for changes in ambient temperature by adjusting the said variable resistor when the power to be monitored is not supplied to the bridge and the said switch is closed then when the said switch is opened and the power to be monitored is supplied to the bridge the bridge is again balanced, said values further being such that the change in power from said source experienced upon opening the switch has a value which is not appreciably dependent on variations in the value of current from said source set by varying the variable resistor in balancing the bridge when the power to be monitored was not supplied to the bridge, whereby the value of the power to be monitored which causes the bridge to be again balanced is substantially independent of variations in value of the said variable resistor, and means to determine when the bridge is balanced.

References Cited in the file of this patent

UNITED STATES PATENTS

| 2,399,674 | Harrison | May 7, 1946 |
| 2,434,610 | Feiker | Jan. 13, 1948 |
| 2,577,543 | Saad | Dec. 4, 1951 |